D. P. LARKINS.
RADIATOR TRUCK.
APPLICATION FILED JUNE 11, 1910.
984,941.
Patented Feb. 21, 1911.
2 SHEETS—SHEET 1.
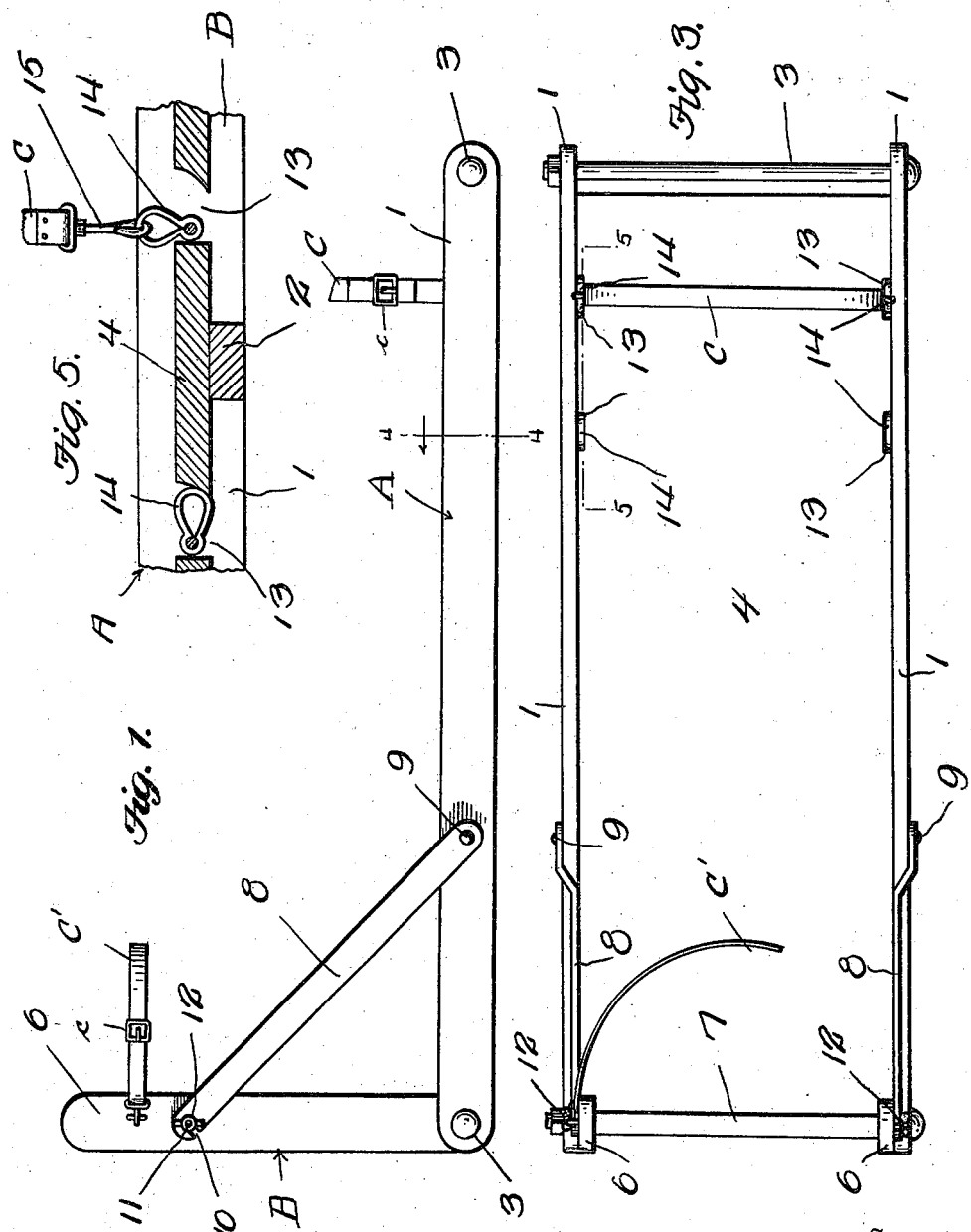
Witnesses
C. Richardson.
C. Broadway.
Inventor
Daniel P. Larkins,
By Victor J. Evans
Attorney

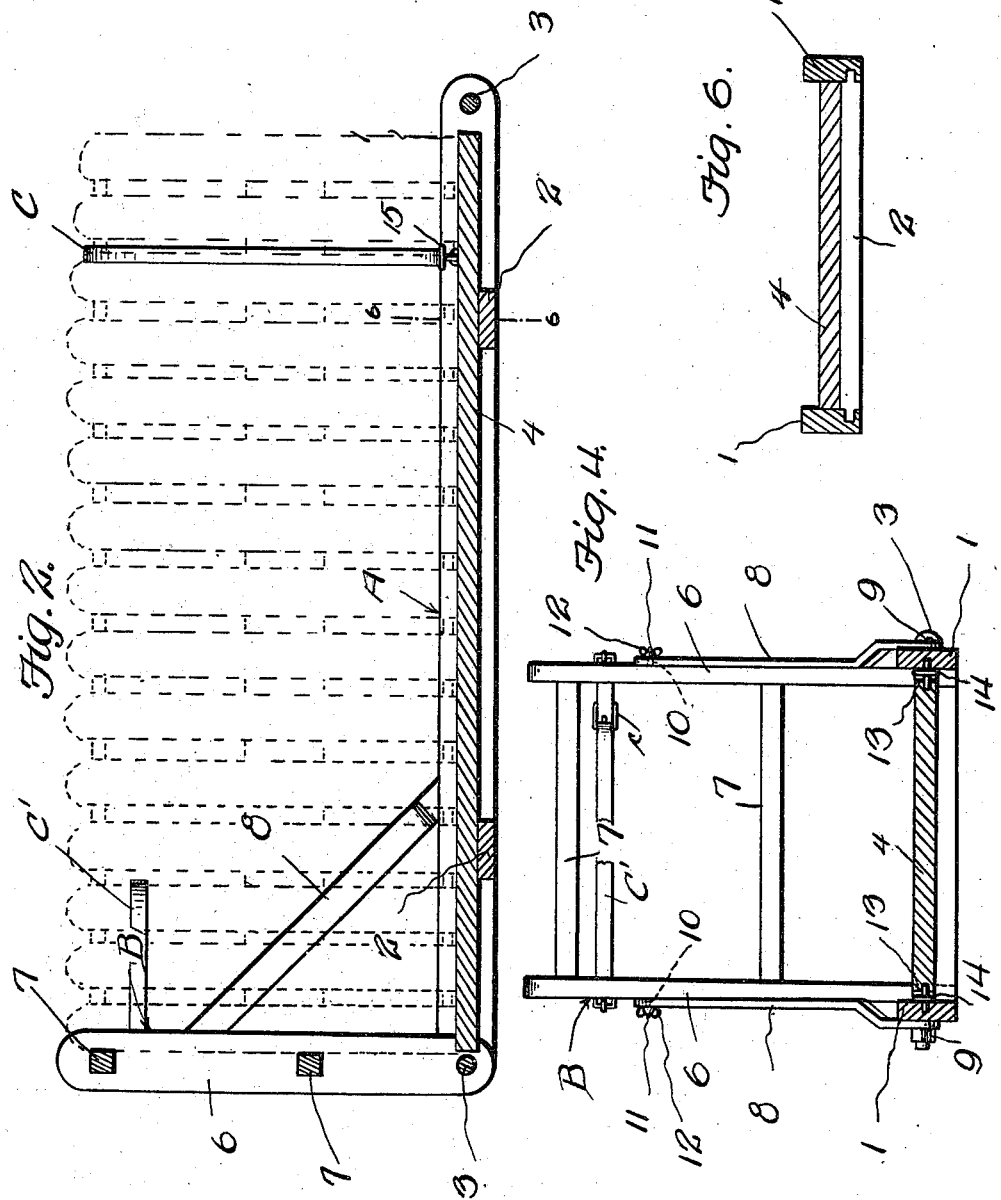

UNITED STATES PATENT OFFICE.

DANIEL P. LARKINS, OF SANDUSKY, OHIO.

RADIATOR-TRUCK.

984,941. Specification of Letters Patent. Patented Feb. 21, 1911.

Application filed June 11, 1910. Serial No. 566,373.

*To all whom it may concern:*

Be it known that I, DANIEL P. LARKINS, a citizen of the United States, residing at Sandusky, in the county of Erie and State of Ohio, have invented new and useful Improvements in Radiator-Trucks, of which the following is a specification.

This invention relates to a truck designed more especially for use by heating and ventilating contractors for enabling the workmen to easily and quickly distribute radiators throughout a building in which a heating plant is to be installed.

The invention has for one of its objects to provide an extremely simple, effective and inexpensive device of this character, whereby the radiators can be distributed with considerably less labor, without danger of marring the wood work, banister and the like in carrying the radiators upstairs, without requiring as many hands as usual, and with a great economy in time.

Another object of the invention is the provision of a novel form of truck especially useful in carrying radiators up stairways, the truck being provided with runners which can readily slide upstairs without marring or injuring the wood work, although the truck may be mounted on a wheeled truck where there is danger of injuring finely finished floors.

With these objects in view and others, as will appear as the description proceeds, the invention comprises the various novel features of construction and arrangement of parts which will be more fully described hereinafter and set forth with particularity in the claim appended hereto.

In the accompanying drawing, which illustrates one embodiment of the invention:—
Figure 1 is a side view of the truck. Fig. 2 is a longitudinal section thereof. Fig. 3 is a plan view. Fig. 4 is a transverse section taken on line 4—4 of Fig. 1. Fig. 5 is a detail section on line 5—5, Fig. 3. Fig. 6 is a section on line 6—6, Fig. 2.

Similar reference characters are employed to designate corresponding parts throughout the several views.

Referring to the drawing, A designates the body or platform of the truck which includes spaced side bars or runners 1 which are secured together by cross pieces 2, which have their ends mortised in the runners, and these runners or side bars are fastened together by bolts 3 arranged at the ends of the platform to serve as handles. On the cross bars 2 is a flat board or plate on which the radiator is supported in an upright position when being transported. On one end of the platform is an upright frame B which forms a rest for the bottom end of the radiator when the latter is being carried up a stairway, the said frame consists of side bars 6 secured together by cross pieces 7, the lower ends of the bars 6 being mounted on the bolt 3 at the adjacent end of the platform, whereby the said frame is hingedly connected with a platform. To hold the frame B in an upright position, tie members or brace rods 8 are hingedly connected at 9 to the outer faces of the runners 1, and the free extremities of these rods are provided with recesses or seats 10 which engage bolts 11 on the side bars 6 of the frame, and on the bolts are thumb nuts 12, whereby the brace rods can be clamped securely or removably in position. These brace rods also serve to prevent the radiator from slipping laterally off the platform. The side edges of the top plate 4 has recesses 13 and in these recesses are pivoted attaching rings 14, which, when not in use, can swing out into the recesses to be out of the way and prevent them from being injured, and a strap C is adapted to connect by means of snaps with either pair of rings 14 so as to hold the radiator on the truck, the strap passing over one end of the radiator, as shown in Fig. 2. A strap C' is fastened to the frame B and is adapted to pass through the radiator between two sections thereof, and in this way the opposite end of the radiator is held on the truck. The straps C and C' are each made in two parts and fastened together by a buckle c so as to facilitate the applying of the straps to the radiator.

In practice, the radiator to be moved is placed on the platform with one end against the upright end frame B and the straps are then fastened on the radiator. The truck with the radiator thereon can now be bodily carried to the place where the radiator is to be used or in case of a heavy radiator, the truck can be pulled or pushed along on the side bars of the platform as runners. Especially in taking a radiator upstairs, the truck can be used according to this latter method, and in transporting the radiator, the frame B is always at the rear so that the radiator will not slip off the platform. The truck can also be used on a roller truck where it is impossible to slide or carry the truck.

From the foregoing description, taken in connection with the accompanying drawings, the advantages of the construction and of the method of operation will be readily apparent to those skilled in the art to which the invention relates, and while I have described the principle of operation of the invention, together with the device which I now consider to be the best embodiment thereof, I desire to have it understood that the device shown is merely illustrative, and that such changes may be made when desired as are within the scope of the claim appended hereto.

What I claim as new and desire to secure by Letters Patent is:—

A truck of the class described comprising runners, means for connecting the runners together, a plate set in between the runners and having recesses in its side edges, devices pivoted in the recesses and movable out of the same, a frame on one end of the runners, means between the runners and frame for holding the latter upright, a strap on the frame for fastening thereto an object to be carried, and another strap adapted to be detachably connected with the said devices and to engage the object to be carried for holding the same on the truck.

In testimony whereof I affix my signature in presence of two witnesses.

DANIEL P. LARKINS.

Witnesses:
 AL. C. LERMANN,
 PHILIP BUERKLE.